July 22, 1952     E. McK. BEEKMAN     2,604,426
METHOD OF FABRICATING A DOUBLE-WALL CONTAINER
Filed Sept. 1, 1950
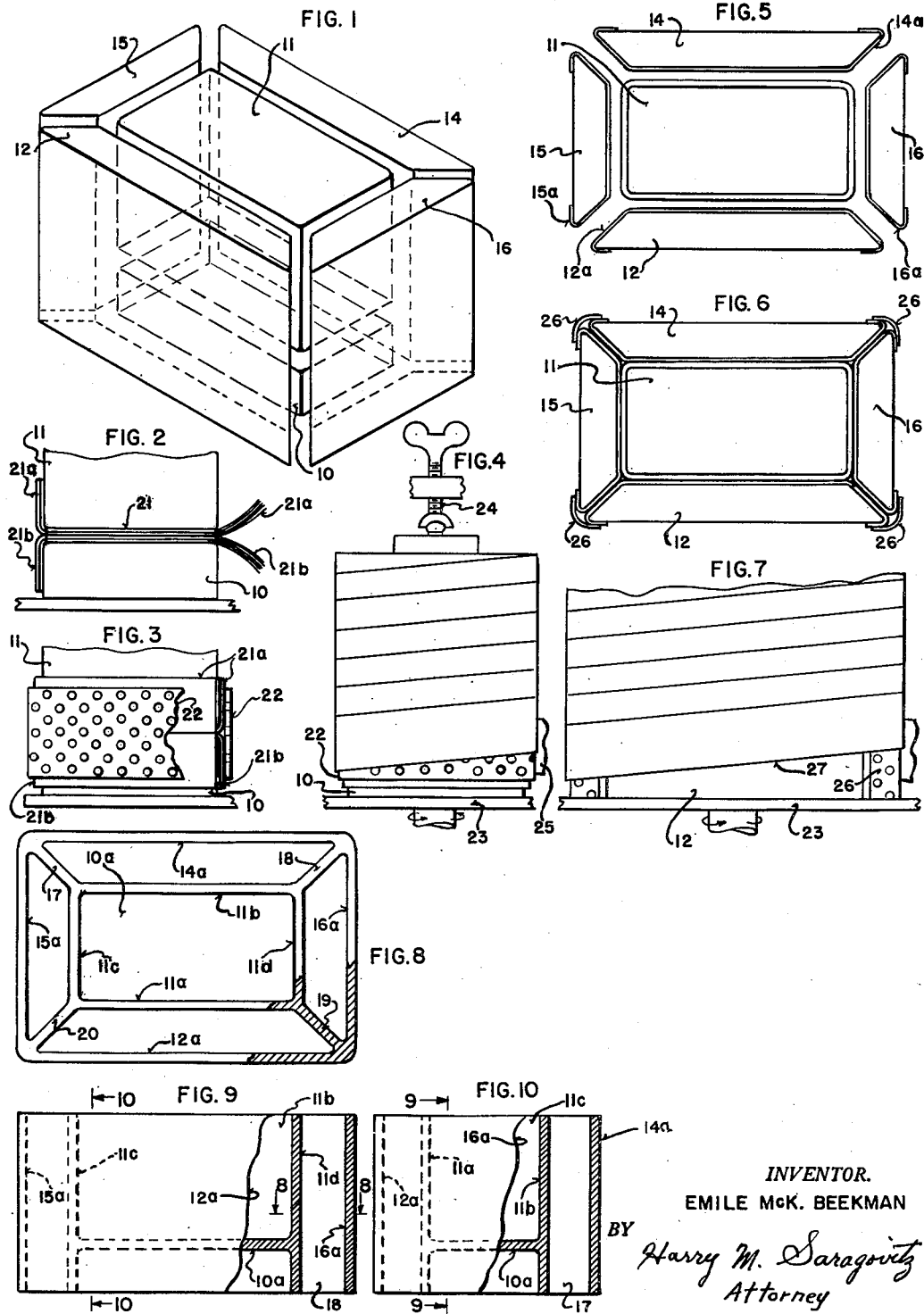
INVENTOR.
EMILE McK. BEEKMAN
BY Harry M. Saragovitz
Attorney Patented July 22, 1952

2,604,426

UNITED STATES PATENT OFFICE 2,604,426

METHOD OF FABRICATING A DOUBLE-WALL CONTAINER

Emile McK. Beekman, Sea Bright, N. J., assignor to the United States of America as represented by the Secretary of the Army Application September 1, 1950, Serial No. 182,697

4 Claims. (Cl. 154—83)

(Granted under the act of March 3, 1883, as amended April 30, 1928; 370 O. G. 757)

The invention described herein may be manufactured and used by or for the Government for governmental purposes, without the payment of any royalty thereon.

This invention relates to an improved method of fabricating a double-wall container.

Double-wall containers of various kinds have been used for the casings or cabinets of apparatus and articles, and for storing or transporting the same. In the handling or use of storage batteries, for example, the size and weight of the same, as well as the mechanical shocks to which they are sometimes subjected continuously under extremely unfavorable temperature conditions or sudden changes in temperature, it becomes important to provide a suitable casing or container which will stand up under the rough usage and difficult conditions thereby to protect the encased battery against damage which otherwise would result.

With the foregoing in mind, it is one of the objects of the invention to provide an improved method of fabricating a double-wall container whereby the four double-walls of a square or rectangular container, for example, can be formed simultaneously and by the use of relatively simple techniques, and in such manner that the finished article will have the ruggedness and the insulating properties required to stand up under severe operating conditions, thereby to protect the contents against destruction or substantial damage which has resulted in use of the various fabrication methods and constructions proposed heretofore.

Other objects and advantages will hereinafter appear.

For the purpose of illustrating the invention, an embodiment thereof is shown in the drawing, wherein Fig. 1 is an isometric view of the mold parts used in carrying out the improved fabricating method in accordance with the invention;

Fig. 2 is a fragmentary, elevational view illustrative of one of the method steps;

Fig. 3 is a view similar to Fig. 2 but partly broken away, and illustrative of a succeeding step in the improved method;

Fig. 4 is an elevational view illustrative of the technique employed in carrying out the method step to follow that shown in Fig. 3;

Figs. 5 and 6 are plan views explanatory of the fabrication technique employed after completion of the step shown in Fig. 4;

Fig. 7 is a view similar to Fig. 4, and illustrative of the method step to follow that shown in Fig. 6;

Fig. 8 is a plan view, partly in section, of a container fabricated in accordance with the invention, the section being taken on the line 8—8 in Fig. 9;

Fig. 9 is a front, elevational view, partly in section, of the container shown in Fig. 8, the section being taken on the line 9—9 in Fig. 10; and Fig. 10 is an elevational view, partly in section, of the container shown in Fig. 8, the section being taken on the line 10—10 in Fig. 9.

For the purpose of simplification, the mold parts used in carrying out the improved fabrication method have been shown isometrically in Fig. 1, out of association with any other parts, and in the relative respective positions they have after the final assembly or fabrication step. These parts shall be identified as the lower inner mold 10, the upper inner mold 11, the outer side molds 12 and 14, respectively, and the outer end molds 15 and 16, respectively.

Figs. 8, 9 and 10 are illustrative of a rectangular, double-wall container made in accordance with the improved fabrication method claimed herein. The container consists of the inner side walls 11a and 11b, the inner end walls 11c and 11d, the outer side walls 12a and 14a, the outer end walls 15a and 16a, and the base 10a. In the claims, the term "base" is used in the broad sense and is intended to refer to an end wall which might be considered as either the top or the bottom of the container, depending upon the position of the latter or the specific use to which it is put. At each of the four corners the inner and outer walls are connected and reenforced by the longitudinally disposed ribs or webs 17, 18, 19, and 20.

In carrying out the first step in the improved fabrication method, to form the bottom 10a of the container, several layers 21 of pliable, impregnated material are placed upon the lower inner mold 10, after which the upper inner mold 11 is placed upon these layers and lined up vertically with mold 10, as shown in Fig. 2.

The material used for the layers 21, and in the other method steps hereinafter explained, may be sheets of paper or wood; sawdust, lignin, rag, vegetable fibre, animal hair, glass mat, or any combination of these pressed into a mat; cotton, linen, glass, or synthetic resin fabric, or any combination of these; natural or synthetic rubber composition; or any desired combination of all. Whatever the material used for layers 21, as well as for the inner and outer walls, it is in strip or sheet form and at least has the characteristics of being pliable to the extent of assuming the shape of a mold or mandrel when wrapped about the same, and of being absorbent or at least capable of retaining an appreciable amount of a resin. Such pliable and absorbent or resin-retentive material is first impregnated with a suitable resin such as a thermosetting low-pressure or contact-pressure resin, or a thermoplastic resin.

The dimensions of layers 21 are such that along each of the four edges, the material protrudes or extends beyond molds 10 and 11 a distance which may be about three inches. The layers 21 form the bottom 10a of the complete container shown in Figs. 8, 9 and 10, and the number used is in accordance with what the thickness or gauge of the bottom 10a is to be. The protruding edges 21a of the top half of layers 21 are folded up, as shown in Figs. 2 and 3, against the respective side and end faces of the upper inner mold 11. In like manner, the protruding edges 21b of the bottom half of layers 21 are folded down against the respective side and end faces of the lower inner mold 10, as shown. For the purpose of reenforcement or additional strength at the juncture of the inner molds 10 and 11, perforated sheets or strips 22 of the impregnated material may be wrapped about the assembly as shown in Fig. 3.

In carrying out the next step in the improved fabrication method, the assembly in Fig. 3 is placed in a suitable jig as shown in Fig. 4. This may comprise a horizontally-disposed table or bed-plate 23 supported for rotation, and adjustable structure designated generally by the reference numeral 24 and providing an upper bearing to support the assembly for rotation with the bed-plate 23, about a vertical axis. An end of a strip 25 of the resin-impregnated material is stuck or otherwise secured to one of the side or end faces of inner mold 11, at the top edge thereof; the bed-plate 23 is rotated as indicated by the arrows; and the strip of material is guided downwardly until the inner molds are completely wrapped about with a layer of the strip-material. The latter is then guided upwardly until the inner molds are again completely wrapped about with a second layer of the strip-material. This operation forms the inner walls 11a, 11b, 11c and 11d of the complete container shown in Figs. 8, 9 and 10, and is repeated until sufficient layers of the material have been wrapped about inner molds 10 and 11 to give the desired thickness or gauge for these inner walls. Only the top surface of the upper inner mold 11 and the bottom surface of the lower inner mold 10, now remain uncovered.

Sheets 12a, 14a, 15a and 16a of resin-impregnated material, equal in height to the outer molds 12, 14, 15 and 16, are now placed against the inner faces of the latter, as shown in Fig. 5, and their edges folded down over the longitudinal edges of the outer molds. These sheets add to the thickness of the inner walls 11a, 11b, 11c and 11d of the complete container, and the folded edges form the reenforcing webs 17, 18, 19 and 20. The outer molds, with the sheets of resin-impregnated material applied thereto as shown in Fig. 5, are now fitted about the wrapped inner-mold assembly which resulted from the step shown in Fig. 4. This results in the combination shown in Fig. 6. Perforated strips 26 of resin-impregnated material are placed around the corners of the assembly shown in Fig. 6, for reenforcement or additional strength at the juncture of adjacent outer molds.

The assembly in Fig. 6 is now placed upon the bed-plate 23 and wrapped, as in Fig. 4, with resin-impregnated, strip material 27, to form the outer side walls 12a and 14a and the outer end walls 15a and 16a. This wrapping step is continued, as in Fig. 4, until the outer walls have the desired thickness or gauge.

The finished unit is now removed from the bed-plate 23 and wrapped in a sheet of rubber, after which it is heated in an autoclave at a temperature, pressure and curing time depending upon the type of impregnating resin used, and then the molds are removed. To facilitate removal of the molds, it is proposed to form them with a sufficient taper, and also to cover them with cellophane or a lubricant. Any material which is sufficiently rigid to withstand the molding temperature and pressure, may be used for the molds, and the edges of the latter are rounded and hooks may be embedded in the material to facilitate removal from the finished piece.

After removal of the inner and outer molds, the space between the double walls, as well as the space formerly occupied by the lower inner mold 10, may be filled with a suitable insulating material. A cover (not shown) is fitted across the bottom of the unit to provide an insulated, double-wall structure for the bottom.

Instead of applying sheet material to the outer molds as in Fig. 5, the latter may be wrapped individually with resin-impregnated strip-material, as in Figs. 4 and 7. Also, instead of using strip-material as shown in Figs. 4 and 7, the two respective assemblies may be wrapped with resin-impregnated sheet-material, the width of the sheets being equal to the height of these assemblies, and the sheets used in sufficient number to give the desired thickness or gauge to the walls. Double-wall containers of a wide variety of shapes and sizes may be made in accordance with the improved fabrication method by constructing the inner and outer mold parts accordingly, to meet or comply with the particular specifications.

As a further modification in the improved fabrication method, for some double-wall containers it is proposed to use outer molds formed or constructed as a honeycomb, and to leave these in the finished unit as integral parts thereof.

For the purpose of clearer illustration of an embodiment of the invention, the thickness or gauge of the sheets and strips of resin-impregnated material has been shown on an exaggerated scale in the drawing.

The broader aspect of the invention is considered to reside in an improved method for fabricating a double-wall container such as is shown in Figs. 8, 9 and 10; wherein an inner mold, such as 10 or 11, is first set up to fix the shape and size of container desired; wherein pliable material, either in strip or sheet form, is then applied to the inner mold to substantially cover the latter; wherein parts constituting an outer-mold assembly, such as the parts 12, 14, 15 and 16, are then applied to the covered inner mold, as shown in Fig. 6; wherein an additional supply of the pliable material is then applied about the outer-mold assembly to form the double-wall construction; and wherein this combination is then treated to cause the double-wall construction of the pliable material to become rigid.

For examples of suitable resins such as a thermosetting low-pressure or contract-pressure resin or such as a thermoplastic resin which might be used in carrying out the present invention, and for details concerning operating techniques in the processing of such resins and concerning, particularly, respective ranges of temperature and of pressure usable in processing resin-impregnated materials in accordance with the present invention, reference is made to the prior art, an example of which being the book by Herbert R. Simonds and M. H. Bigelow entitled "The New Plastics," published May 1945 by D. Van Nostrand Company, Inc., 250 Fourth Avenue, New York, N. Y.

It will be apparent to those skilled in the art that various changes or modifications, other than those disclosed herein, are possible without departing from the spirit of the invention, or the scope of the claims.

The invention claimed is:

1. In the art of fabricating a double-wall container, the method steps which include setting up lower and upper inner-mold parts to fix the shape and size of the container desired; resin-impregnating pliable and absorbent material; interposing between said parts some of said material to form the bottom of said container; wrapping some of said material about said parts and about and in contact with the edges of said bottom material to form inner walls for said container; applying, to the wrapped inner-mold parts, parts constituting an outer-mold assembly; wrapping some of the pliable and impregnated material about said outer-mold assembly to form with said inner walls a double-wall construction; subjecting the assembly aforesaid to conditions of temperature and pressure respectively appropriate for curing the resin and for a period of time sufficient for the resin-impregnated material to become relatively rigid; and removing said inner-mold parts and said outer-mold parts out of association with the relatively rigid wrappings to leave per se the double-wall container of the shape and size desired.

2. In the art of fabricating a double-wall container, the method steps which include resin-impregnating pliable and absorbent material, shaping and supporting some of said impregnated material to constitute a base for said container, shaping and supporting some of said impregnated material about and in contact with the edges of said base material to constitute the inner-wall structure for said double-wall container, shaping and supporting some of said impregnated material about and in spaced relation with respect to said inner-wall material to constitute the outer-wall structure for said double-wall container; and subjecting the assembly comprising said base material and said inner-wall material and said outer-wall material to temperature and pressure conditions respectively appropriate for curing the resin and maintained for a period of time sufficient to cause said assembly to become a unitary, double-wall, rigid container of the character described.

3. In the art of fabricating a double-wall container, the method steps which include resin-impregnating pliable and absorbent material, shaping and supporting some of said impregnated material to constitute a base for said container, shaping and supporting some of said impregnated material about and in contact with the edges of said base material to constitute the inner-wall structure for said double-wall container, shaping and supporting some of said impregnated material about and in spaced relation with respect to said inner-wall material to constitute the outer-wall structure for said double-wall container, shaping and supporting some of said impregnated material to extend longitudinally of the container and between and in contact with the adjacent faces of the double-wall structure; and subjecting the assembly comprising said last-named material and said base material and said inner-wall material and said outer-wall material to temperature and pressure conditions respectively appropriate for curing the resin and maintained for a period of time sufficient to cause said assembly to become a unitary, double-wall, rigid container of the character described.

4. In the art of fabricating a substantially rectangular, double-wall container having a reenforcing web between the double-wall structure at each of the four corners thereof; the method steps which include resin-impregnating pliable and absorbent material, shaping and supporting some of said impregnated material to constitute a base for said container, shaping and supporting some of said impregnated material about and in contact with the edges of said base material to constitute the inner-wall structure for said double-wall container, shaping and supporting some of said impregnated material about and in spaced relation with respect to said inner-wall material to constitute the outer-wall structure for said double-wall container, shaping and supporting some of said impregnated material to extend longitudinally of the container and between and in contact with the adjacent faces of the double-wall structure at each of said four corners; and subjecting the assembly comprising said last-named material and said base material and said inner-wall material and said outer-wall material to temperature and pressure conditions respectively appropriate for curing the resin and maintained for a period of time sufficient to cause said assembly to become a unitary, double-wall, rigid container of the character described.

EMILE McK. BEEKMAN.

REFERENCES CITED

The following references are of record in the file of this patent:

UNITED STATES PATENTS

| Number | Name | Date |
| --- | --- | --- |
| 1,393,541 | Kemp | Oct. 11, 1921 |
| 1,520,996 | Bastian | Dec. 30, 1924 |
| 2,340,209 | Skolnik | Jan. 25, 1944 |
| 2,445,290 | Gonda | July 13, 1948 |